United States Patent [19]

Tomita et al.

[11] Patent Number: 4,622,637

[45] Date of Patent: Nov. 11, 1986

[54] OPTIMUM SHIFT TIMING INDICATING DEVICE FOR A VEHICLE

[75] Inventors: Kazuo Tomita, Gotenba; Kouhei Igarashi, Susono, both of Japan

[73] Assignee: Toyota Jidosha Kabushiki Kaisha, Toyota, Japan

[21] Appl. No.: 534,696

[22] Filed: Sep. 22, 1983

[30] Foreign Application Priority Data

Oct. 4, 1982 [JP] Japan ................................ 57-174378

[51] Int. Cl.$^4$ ...................... B60K 41/18; G09B 19/16; G07C 5/08
[52] U.S. Cl. .............................. 364/424.1; 340/52 D; 364/442; 434/71
[58] Field of Search ...................... 364/424, 424.1, 442; 340/52 R, 52 D; 434/71; 74/866

[56] References Cited

U.S. PATENT DOCUMENTS

| | | | |
|---|---|---|---|
| 4,150,497 | 4/1979 | Weber | 434/71 |
| 4,198,882 | 4/1980 | Kiencke et al. | 74/866 |
| 4,355,296 | 10/1982 | Drone | 340/52 D |
| 4,463,427 | 7/1984 | Bonnetain et al. | 364/424.1 |
| 4,474,081 | 10/1984 | Kinugasa et al. | 364/866 X |
| 4,539,868 | 9/1985 | Habu | 364/424.1 |
| 4,559,599 | 12/1985 | Habu et al. | 364/424.1 |

FOREIGN PATENT DOCUMENTS 3128080  2/1983  Fed. Rep. of Germany ... 364/421.1

Primary Examiner—Felix D. Gruber
Attorney, Agent, or Firm—Cushman, Darby & Cushman

[57] ABSTRACT

An optimum shift timing indicating device for a vehicle includes: a speed sensor for detecting a rotational speed of an engine or a running speed of the vehicle; a load sensor for detecting an engine load; a data processing device having a data map or maps fewer in number than gear positions of the vehicle transmission, said data map or maps having a set shift-up region and/or shift-down region selected in accordance with the rotational speed of the engine or the running speed of the vehicle and the engine load, for emitting a shift-up instruction signal and/or a shift-down instruction signal in accordance with the rotational speed of the engine or the running speed of the vehicle and the engine load; and a shift instructing device for giving a driver a shift-up instruction and/or a shift-down instruction in response to an output from said data processing device; so that instruction about the optimum shift timing can be given to the driver with the use of only a small memory capacity.

20 Claims, 7 Drawing Figures

OPTIMUM SHIFT TIMING INDICATING DEVICE FOR A VEHICLE

BACKGROUND OF THE INVENTION

1. Field of the Invention

This invention relates to an optimum shift timing indicating device for a vehicle, and more particularly to an optimum shift timing indicating device suitable for use in a motor vehicle provided with a manual transmission and an electronically controlled fuel injection engine.

2. Description of the Prior Art

Recently, with the possible dry-up of petroleum resources in the near future being forcasted, the reduction of fuel consumption of the vehicles such as motor vehicles has become one of the social demands. In general, the fuel consumption of the motor vehicle varies to a considerable extent depending on not only the fuel consumption performance of an engine but also the driving manner of a driver, and hence, a desire has been voiced for a device which instructs the driver about the optimum driving methods suitable for the present running condition of the engine, since an ordinary driver does not have a satisfactory knowledge about motor vehicles. With this end in view, heretofore, there has been put to use a so-called economy meter for indicating an engine load by the intake vacuum, a so-called drive computer for calculating and indicating a fuel consumption per unit running distance (Km/l) or the like. However, the above-described methods present such disadvantages that the effect on fuel consumption is not necessarily satisfactory because they cannot give the driver information about "what measure should be taken then?" in either case.

Therefore, a device may be proposed in which the optimum gear position (chosen in accordance with an engine speed or a running speed of a vehicle and an engine load, taking into consideration the fuel consumption performance and the running performance as shown in FIG. 1) is stored in a memory, a gear position at present (which is calculated from the engine speed and the vehicle speed) is compared with the optimum gear position for example, and, if the gear positions are different from each other, the optimum gear position is displayed. However, the device of the type described has been disadvantageous in that many data maps are needed which indicate the optimum gear positions corresponding to all of the gear positions (five speeds in the example shown in FIG. 1) of the transmission. The process becomes complicated because the present gear position is calculated and compared with the optimum gear position and a large memory capacity is required.

SUMMARY OF THE INVENTION

The present invention has been developed to obviate the above-described disadvantages of the prior art and has as its first object the provision of an optimum shift timing indicating device for a vehicle, capable of giving a driver information regarding the optimum shift timing, taking into consideration of the fuel consumption performance and the running performance by the use of a small memory capacity, so that the fuel consumption can be effectively decreased.

In addition to its first object, the present invention has as its second object the provision of an optimum shift timing indicating device for a vehicle, which can dispense with a load sensor separately provided, when applied to a motor vehicle provided with an electronically-controlled, fuel-injection engine sensing the intake air flowrate.

In addition to its first object, the present invention has as its third object the provision of an optimum shift timing indicating device for a vehicle, capable of indicating the optimum shift timings by use of the least number of data maps.

In addition to its first object, the present invention has as its fourth object the provision of an optimum shift timing indicating device for a vehicle, capable of satisfactorily applying the present invention even when the number of gear positions of a transmission is large.

In addition to its first object, the present invention has as its fifth object the provision of an optimum shift timing indicating device for a vehicle, capable of giving a driver highly reliable information without providing an abnormal indication or an unnecessary indication.

In addition to its first object, the present invention has as its sixth object the provision of an optimum shift timing indicating device for a vehicle, capable of allowing the driver to easily and reliably learn the optimum shift timing.

To achieve the aforesaid first object, the present invention contemplates that the optimum shift timing indicating device of a vehicle comprises: a speed sensor for detecting a rotational speed of an engine or a running speed of a vehicle; a load sensor for detecting an engine load; a data processing means having a data map or maps fewer in number than gear positions of a transmission, the data map or maps having a set shift-up region and/or shift-down region in accordance with the rotational speed of the engine or the running speed of the vehicle and the engine load, for emitting a shift-up instruction signal and/or a shift-down instruction signal in accordance with the rotational speed of the engine or the running speed of the vehicle and the engine load; and a shift instructing means for giving a driver a shift-up instruction and/or a shift-down instruction in response to an output from the data processing means.

To achieve the aforesaid second object, the present invention contemplates that the aforesaid load sensor is substituted by an air flow meter for detecting an intake air flowrate and the aforesaid speed sensor for detecting the rotational speed of the engine, whereby the engine load is obtained from an intake air flowrate per rotation of the engine.

To achieve the aforesaid third object, the present invention contemplates that the aforesaid data maps are formed into a single map commonly used for respective gear positions regardless of the number of the gear positions of the transmission.

To achieve the aforesaid fourth object, the present invention contemplates that the aforesaid data maps are formed into two maps, respectively set in accordance with a gear position on the higher speeds' side and a gear position on the lower speeds' side of the transmission.

To achieve the aforesaid fifth object, the present invention contemplates that the aforesaid data processing means does not emit a shift-up instruction signal and a shift-down instruction signal when a throttle valve is closed, a clutch is in operation or the vehicle is stopped.

To achieve the same fifth object, the present invention contemplates that the aforesaid data processing means does not emit a shift-up instruction signal during running at the highest speed gear position.

To achieve the aforesaid sixth object, the present invention contemplates that the aforesaid shift instructing means gives aural instructions as well as visual instructions.

According to the present invention, information regarding the optimum shift timing can be given to a driver by use of a memory capacity smaller than the conventional one, and the fuel consumption can be decreased by about 10% without the running performance being affected. Furthermore, not only the cost is lowered by the reduction of the memory capacity, but also the process time can be shortened due to the simplification of the process.

BRIEF DESCRIPTION OF THE DRAWINGS

The exact nature of this invention, as well as other objects and advantages thereof, will be readily apparent from consideration of the following specification relating to the accompanying drawings, in which like reference characters designate the same or similar parts throughout the figures and wherein.

DETAILED DESCRIPTION OF THE INVENTION

A detailed description will now be given of an embodiment of a motor vehicle provided with a manual transmission and an electronically-controlled, fuel-injection engine sensing the intake air flowrate, to which is applied the optimum shift timing indicating device according to the present invention, with reference to the drawings.

Figure 1:
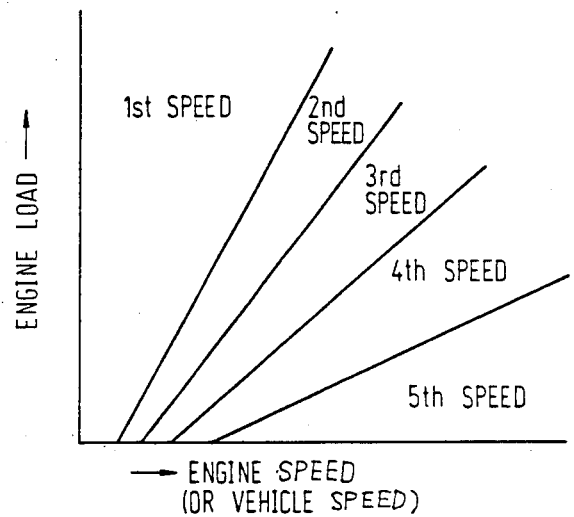
FIG. 1 is a diagram showing an example of prior art data maps when the optimum gear positions are stored in accordance with the engine speed and the engine load.
Figure 2:
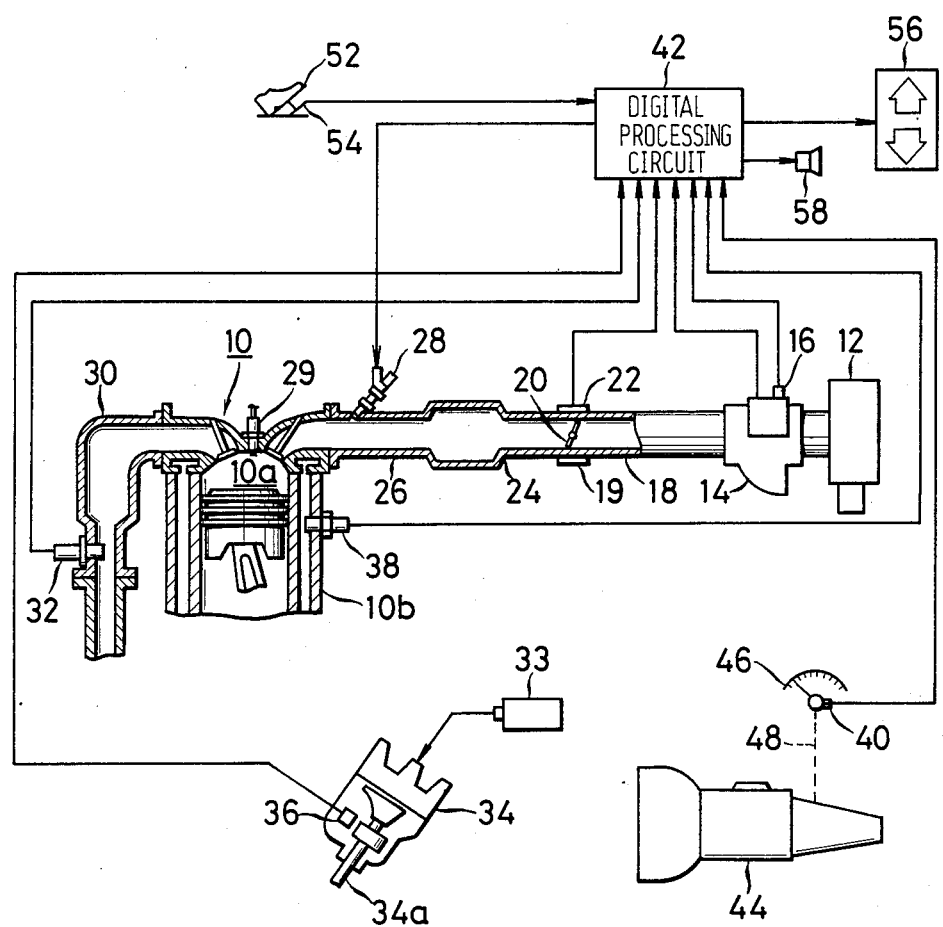
FIG. 2 is a block diagram showing the arrangement of the essential portions of one embodiment of a motor vehicle provided with an electronically-controlled, fuel-injection engine and a manual transmission, to which is applied the optimum shift timing indication device according to the present invention.

The present embodiment is of such an arrangement that, in a motor vehicle as shown in FIG. 2, which has an electronically-controlled, fuel-injection engine 10 sensing the intake air flowrate. Engine 10 includes an air cleaner 12 for taking in external air; an air flow meter 14 for detecting a flowrate of intake air; an intake air temperature sensor 16 for detecting the temperature of intake air, incorporated in the air flow meter 14; a throttle valve 20 provided in a throttle body 19 installed in an intermediate portion of an intake pipe 18 and rotatable in operational association with an accelerator pedal, not shown, disposed at a driver's seat, for controlling the flowrate of intake air; a throttle sensor 22 including an idle switch to be turned "ON" when the throttle valve 20 is fully closed, for detecting the opening of the throttle valve 20; a surge tank 24 for preventing interference of the intake air; injectors 28 provided on an intake manifold 26, for blowing out fuel into each intake port of the engine 10; spark plugs 29 for igniting an air-fuel mixture gas introduced in combustion chambers 10a of the engine; an oxygen concentration sensor (referred to as "$O_2$ sensor") 32 provided on an exhaust manifold 30, for sensing an air-fuel ratio from the oxygen concentration in the exhaust gas; a distributor 34 having a distributor shaft 34a rotatable in operational association with the rotation of a crankshaft of the engine 10, for distributing a secondary ignition signal of high voltage (generated in an ignition coil 33) to the spark plugs 29 of each cylinder of the engine 10; a crank angle sensor 36 incorporated in the distributor 34, for outputting a crank angle signal as an engine rotation signal in accordance with the rotation of the aforesaid distributor shaft 34a; a coolant temperature sensor 38 provided on a cylinder block 10b of the engine 10, for sensing the temperature of an engine coolant; a vehicle speed sensor 40 for detecting a running speed of the vehicle from a rotational speed of a speed meter cable 48 connecting an output shaft of a manual transmission 44 and vehicle speed meter 46; and a digital processing circuit 42 in which a basic injection time per cycle of the engine is calculated in accordance with the intake air flowrate fed from the aforesaid air flow meter 14 and the engine speed obtained from the crank angle signal fed from the aforesaid crank angle sensor 36, a result thus calculated is subjected to an increase or decrease correction in accordance with an output from the aforesaid throttle sensor 22, an air-fuel ratio fed from the aforesaid $O_2$ sensor 32, an engine coolant temperature fed from the aforesaid coolant temperature sensor 38 and the like so as to provide fuel injection time and feed injector opening time signals to the aforesaid injectors 28; and the manual transmission 44 for performing speed change operations in accordance with the running condition of the vehicle; there are provided a clutch switch 54 for detecting the presence or absence of a clutch operation from the depressed state of a clutch pedal 52 provided at a driver's seat, a shift direction instruction lamp 56 provided near the driver's seat, for indicating a shift direction at the time of the optimum shift timing, and a speaker 58 for generating confirmative sounds when the shift direction is indicated in the shift direction instruction lamp 56. The aforesaid digital processing circuit 42 stores therein a single data map in which a shift-up region and a shift-down region are set in accordance with the engine speed and the engine load obtained from an intake air flowrate per rotation of the engine. The single data map being commonly used for respective gear positions regardless of the number of the gear position in the aforesaid manual transmission 44. The digital processing circuit 42 outputs a shift-up instruction signal and a shift-down instruction signal to the aforesaid shift direction instruction lamp 56 in accordance with the engine speed and the engine load, and confirmative sounds are generated by the speaker 58 when a shift-up or a shift-down is instructed.

Figure 3:
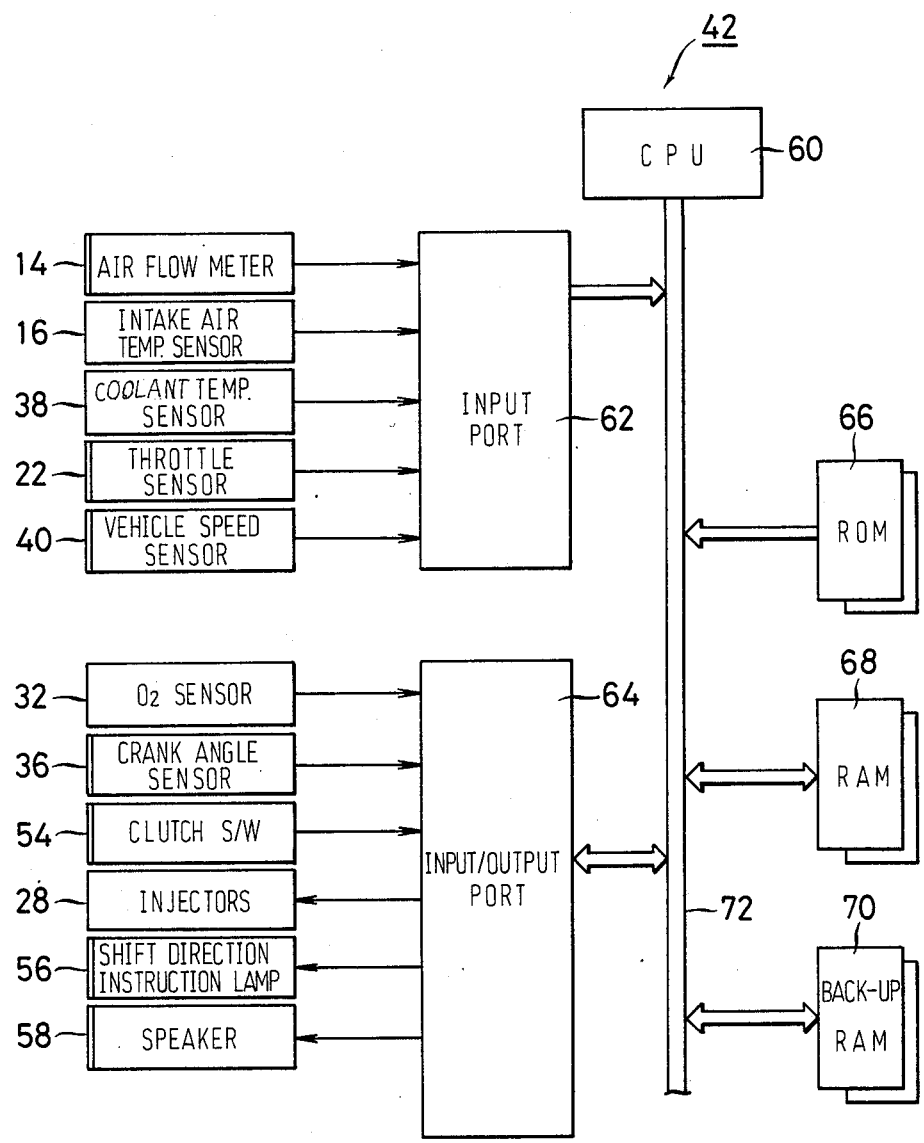
FIG. 3 is a block diagram showing the arrangement of the digital processing circuit used in the above embodiment.

As shown in FIG. 3 in detail, the digital processing circuit 42 comprises: a central processing unit (referred to as "CPU") 60 consisting of a microprocessor for effecting various operations; an input port 62 provided with a multiplexer and an analog/digital converter for converting analog signals fed from the aforesaid air flow meter 14, intake air temperature sensor 16, coolant temperature sensor 38, and the like, into digital signals and successively taking in the same; an input/output port 64 provided with a buffer, for taking in digital signals fed from the aforesaid $O_2$ sensor 32, crank angle sensor 36, clutch switch 54, and the like, and outputting control signals to the aforesaid injectors 28, shift direction instruction lamp 56, speaker 58, and the like, in accordance with results calculated in the CPU 60 at predetermined timings; a Read Only Memory (referred to as "ROM") 66 for storing control programs, various constants and the like; a Random Access Memory (referred to as "RAM") 68 for temporarily storing operational data in the CPU 60 and the like; a backup Random Access Memory 70 capable of being fed from an auxiliary power source to maintain the memory storage even if the engine is stopped; and a common bus 72 connecting the aforesaid respective components to one another.

Figure 4:
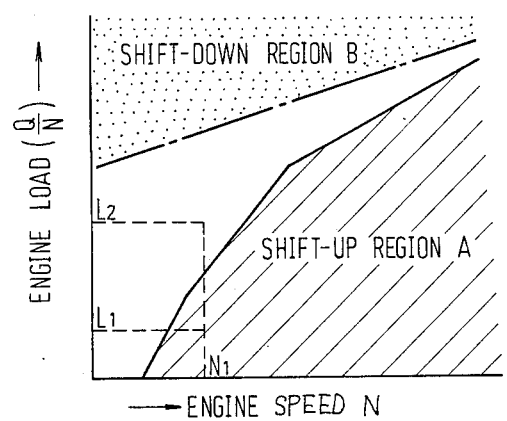
FIG. 4 is a diagram showing the data map wherein the shift-up region and the shift-down region are set in accordance with the engine speed and the engine load in the above embodiment.

In consequence, the optimum shift timing indication device according to the present invention utilizes the crank angle sensor 36, the air flow meter 14 constituting the load sensor with the crank angle sensor, the throttle sensor 22, the vehicle speed sensor 40 and the digital processing circuit 42, all of which are provided on the electronically-controlled, fuel-injection device. The invention makes further use of the clutch switch 54, the shift direction instruction lamp 56 and the speaker 58, all of which have been newly added. Further, in ROM 66 of the aforesaid digital processing circuit 42, there are written in a single data map (hereinafter referred to as a "shift map") in which a shift-up region A (a hatched region) and a shift-down region B (a dotted region) as shown in FIG. 4, are set in accordance with the engine speed and the engine load, the single data map being commonly used for respective gear positions regardless of the number in gear position of the transmission, data indicating a ratio between the engine speed and the vehicle speed at the highest speed gear position, and the like.

Description will now be given of the operation of the present invention.

Firstly, a brief description will be given of the action of the electronically controlled fuel injection device. The digital processing circuit 42 calculates a basic injection time TP through the following equation on the basis of an intake air flowrate Q from the air flow meter 14 and an engine speed N calculated from a crank angle signal from the crank angle sensor 36.

$$TP = K \times Q/N \quad (1)$$

where K is a constant.

Further, a valid injection time TAU1 is calculated by correcting the aforesaid basic injection time TP in response to signals from the respective sensors through the following equation.

$$TAU1 = F \times Tp \quad (2)$$

where F is a coefficient of correction for effecting various corrections.

The valid injection time TAU1 thus obtained is added to an invalid injection time TAUV corresponding to a delayed response time of the injector 28 when the battery voltage drops for the injection process as shown in the following equation, thereby providing a fuel injection time TAU.

$$TAU = TAU1 + TAUV \quad (3)$$

A valve opening time signal corresponding to this fuel injection time TAU is fed to the injector 28, whereby the injector 28 is opened in synchronism with the rotation of the engine only for the fuel injection time TAU, so that fuel can be blown into the intake manifold 26 of the engine.

Figure 5:
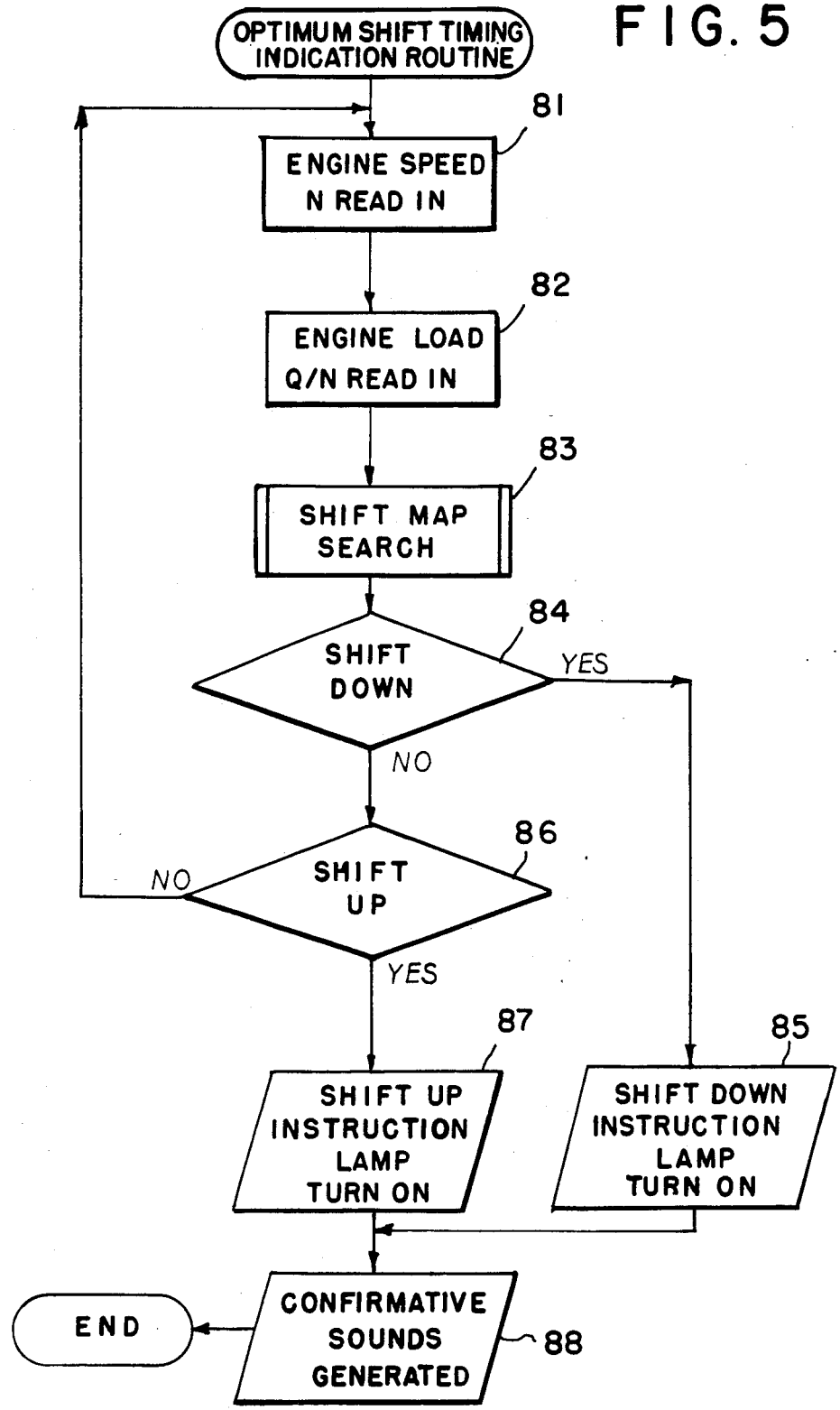
FIG. 5 is a flow chart showing the control program for indicating the optimum shift timing in the above embodiment.

On the other hand, the optimum shift timing indication according to the present embodiment is carried out in accordance with the control program shown in FIG. 5.

In accordance with the present invention, upon the turning "ON" of a power source switch, the digital processing circuit 42 begins operation and the processing of its routine is carried out in response to a predetermined timing signal (for example, a timer signal emitted once every 60 seconds) after the start of the engine. More specifically, firstly, in step 81 the engine speed N obtained from the crank angle sensor 36 is read in, and in step 82, an intake air flowrate per rotation of the engine Q/N, which was calculated when the fuel injection time TAU was calculated, is read in as the engine load. Then, the process goes forward to step 83, where the optimum shift instruction data are searched by use of the shift map which has been stored in the ROM 66, as shown in the aforesaid FIG. 4, and is temporarily stored in RAM 68. The optimum shift instruction data are searched such that, for example, when the engine speed N, which has been read in the aforesaid step 81, is $N_1$ and the intake air flow rate per rotation of the engine Q/N, which has been read in the aforesaid step 82, is $L_1$, a shift-up should be carried out. On the other hand, even if the engine speed N is $N_1$ in the same manner as above, when the intake air flow rate per rotation of the engine Q/N is $L_2$, no shift should be carried out.

Subsequently, the process goes forward to step 84, where it is determined whether the optimum shift instruction data indicates a shift-down or not. If the result of the determination is positive, the process goes forward to step 85, where a shift-down indication instruction signal is outputted to the shift direction indication lamp 56 to turn a shift-down indication lamp (an arrow mark directed downward) "ON".

On the other hand, when the result of the determination in the aforesaid step 84 is negative, the process goes forward to step 86, where it is determined whether the optimum shift instruction data indicates a shift up or not. When the result of the determination is positive, the process goes forward to step 87, where a shift-up indication instruction signal is output to the shift direction instruction lamp 56 to turn a shift-up instruction lamp (an arrow mark directed upward) "ON".

Upon completion of step 87 or the aforesaid step 85, i.e., when either the shift-up instruction lamp or the shift-down instruction lamp of the shift direction instruction lamp 56 is turned "ON", the process goes forward to step 88, where a signal for generating a confirmative signal is input to the speaker 58 to generate oscillating sounds for confirmation, whereby the driver is urged to conduct a gear shift operation from the present position of the gear to the optimum shift direction being indicated, thus completing the shift direction process at this time.

Figure 5A:
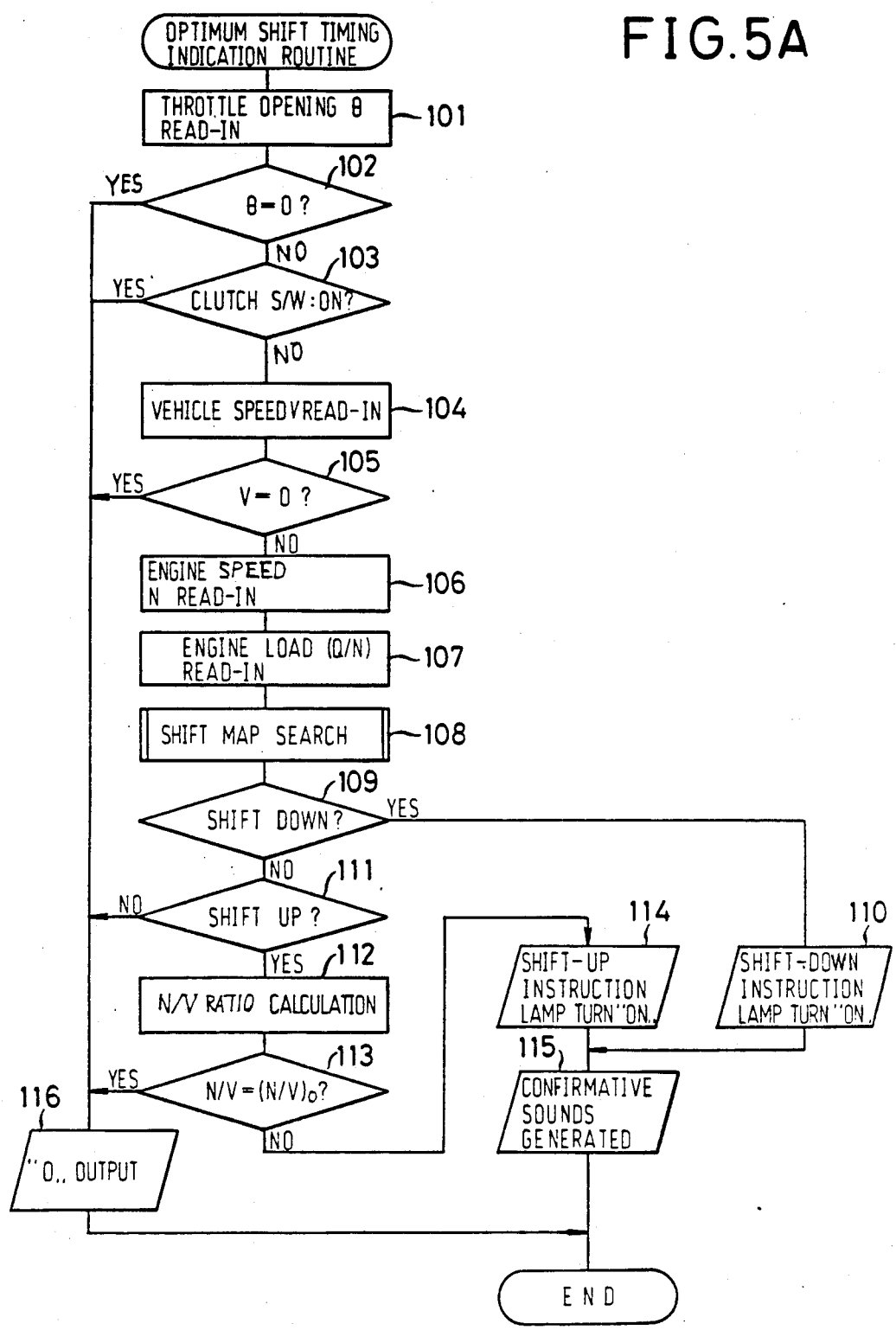
FIG. 5A is a flow chart showing the control program for indicating the optimum shift timing in accordance with a further embodiment of the present invention.

FIG. 5A depicts a flow chart of an alternative routine used by digital processing circuit 42. In this alternative routine, more elaborate steps are included in order to insure that the shift signals are not provided when the throttle valve is closed, the clutch is in operation, the vehicle is stopped, or a shift-up instruction is indicated when the transmission is already in the highest gear.

Namely, upon the turning "ON" of a power source switch, the digital processing circuit 42 is started in operation, the processing of the present routine is carried out in response to a predetermined timing signal (for example, a timer signal emitted once every 60 seconds) after the start of the engine. More specifically, firstly, in Step 101, a throttle opening signal $\theta$ emitted from the aforesaid throttle sensor 22 is read in, and stored in the RAM 68 by the CPU 60. Subsequently, the process goes forward to Step 102, where it is judged whether the throttle opening $\theta$ is zero or not. When the result of this judgment is negative, the process goes forward to Step 103, where, in response to an output from the clutch switch 54, it is judged whether the clutch switch 54 is "ON" or not. When the result of judgment in this Step 103 is negative, in other words, when the clutch 52 is not in operation, the process goes forward to Step 104, where a vehicle speed V is read in in response to an output from the vehicle speed sensor 40. Subsequently, the process goes forward to Step 105, where judgment is made whether the vehicle speed V thus read in is zero or not. When the result of judgement is negative, i.e., when the vehicle is in running operation, the process goes forward to Step 106, where an engine speed N obtained from the crank angle sensor 36 is read in, and, in Step 107, an intake air flowrate per rotation of the engine Q/N, which was calculated when the fuel injection time TAU was calculated, is read in as the engine load. Then, the process goes forward to Step 108, where the optimum shift instruction data are searched by use of the shift map which has been stored in the ROM 66 as shown in the aforesaid FIG. 4, and is temporarily stored in the RAM 68. The optimum shift instruction data are searched such that, for example, when the engine speed N, which has been read in the aforesaid Step 106, is $N_1$, and the intake air flowrate per rotation of the engine Q/N, which has been read in the aforesaid Step 107, is $L_1$, a shift-up should be carried out. On the other hand, even if the engine speed N is $N_1$ is the same manner as above, when the intake air flowrate per rotation of the engine Q/N is $L_2$, no shift should be carried out.

Subsequently, the process goes forward to Step 109, where it is judged whether the optimum shift instruction data indicates a shift-down or not. If the result of judgment is positive, the process goes forward to Step 110, where a shift-down indication instruction signal is outputted to the shift direction indication lamp 56 to turn a shift-down indication lamp (an arrow mark directed downward) "ON".

On the other hand, when the result of judgment in the aforesaid Step 109 is negative, the process goes forward to Step 111, where it is judged whether the optimum shift instruction data indicate a shift-up or not. When the result of judgment is positive, the process goes forward to Step 112, where a ratio between the engine speed N and the vehicle speed V (hereinafter referred to as a "ratio N/V") is calculated. Subsequently, the process goes forward to Step 113, where it is judged whether the ratio N/V calculated is the ratio $(N/V)_0$ corresponding to the highest speed gear position which has been previously stored in the ROM 66. When the result of judgment is negative, i.e., when the vehicle is running at a gear position other than the highest speed gear position, the process goes forward to Step 114, where a shift-up indication instruction signal is output to the shift direction instruction lamp 56 to turn a shift-up instruction lamp (an arrow mark directed upward) "ON".

Upon completion of the Step 114 or the aforesaid Step 110, i.e., when either the shift-up instruction lamp or the shift-down instruction lamp of the shift direction instruction lamp 56 is turned "ON", the process goes forward to Step 115, where a signal for generating a confirmative signal is input to the speaker 58 to generate oscillating sounds for confirmation, whereby the driver is urged to conduct a gear shift operation from the gear position at present to the optimum shift direction being indicated, thus completing the shift direction process of this time.

If the confirmative sounds generated by the speaker 58 are varied in tone for either the shift-up or the shift-down, the driver can learn which operation is to be conducted, the shift-up or the shift-down, without watching the indication of the shift direction instruction lamp 56, so that the driver can readily and safely learn the shift timing and direction.

On the other hand, when the results of judgements in the aforesaid Steps 102, 103, 105 or 113 are positive or when the result of judgment in the aforesaid Step 111 is negative, it is judged that the throttle valve 20 is closed for deceleration, the clutch is in operation, the vehicle is stopped, neither shift-up region nor shift-down region is being indicated, or necessity for outputting a shift-up instruction signal is eliminated during running at the highest speed gear position, and the process goes forward to Step 116, where neither the shift direction indication lamp 56 is turned "ON" nor the confirmative sounds are generated by the speaker 58, thus completing this routine.

In the present embodiment, the present invention is applied to a motor vehicle provided with the electronically-controlled, fuel-injection engine sensing the intake air flowrate, and the load sensor is substituted by the air flow meter for detecting the intake air flowrate and the rotational speed sensor for detecting the engine speed, so that a separate load sensor can be dispensed with. In addition, the method of detecting the engine load need not necessarily be limited to this arrangement, but, for example, such an arrangement may be adopted that the engine load is detected from a basic injection time TP in the aforesaid electronically-controlled, fuel-injection device. Alternatively, the separate engine load sensor may be provided or the engine load may be detected by any other method, so that the present invention can be similarly applied to vehicles provided with a commonly known internal combustion engine.

Figure 6:
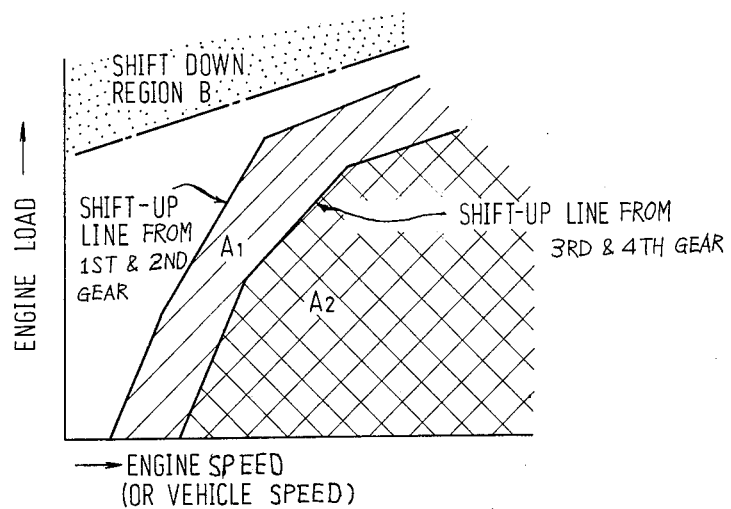
FIG. 6 is a diagram showing an example of data maps wherein two shift-up regions and one shift-down region are set in accordance with the engine speed and the engine load in a modification of the present invention.

Furthermore, in the present embodiment, the single data map used for the respective gear positions does not depend on the number of the gear position of the transmission. This is particularly advantageous in that the memory capacity may be made small. Additionally, the number of the data maps need not be limited to one type, but, for example, when the number of gear positions of the transmission is large (for example, five speeds), such an arrangement may be adopted that, as shown in FIG. 6, the shift-up region is divided into two sections including a shift-up region $A_1$ when a gear position such as first or second gear on the lower speeds' side is selected and a shift-up region A₂ when a gear position such as third or fourth gear on the higher speeds' side is selected, whereby two data maps are provided. In this case, for example, such an operation is required that the N/V ratios corresponding to the respective gear positions are stored in the ROM 66 and the gear position is judged.

Further, in the present embodiment, when the throttle valve is closed, the clutch is in operation or the vehicle is stopped, neither the shift-up instruction nor the shift-down instruction is conducted, so that neither an abnormal instruction nor an unnecessary instruction may be effected, thereby providing the driver highly reliable information.

Still further, in the present embodiment, when the vehicle is running at the highest speed gear position, the shift-up instruction is not conducted, so that an unnecessary instruction may not be effected, therby providing the driver highly reliable information.

Furthermore, in the present embodiment, the shift direction indication lamp 56 instructs the shift direction, and moreover, the confirmative sounds are generated by the speaker 58, so that the driver can easily and quickly learn the optimum shift timing.

In the above embodiment, a data map or maps are set in accordance with the engine speed and the engine load, however, the arrangement of the data map or maps need not necessarily be limited to this, and the shift-up region and the shift-down region may be set in accordance with the running speed of the vehicle and the engine load by use of the running speed of the vehicle instead of the engine speed.

Further, in the above embodiment, both the shift-up region and the shift-down region are set in the data map or maps, and both the shift-up instruction and the shift-down instruction are effected by the optimum shift timing indication device. In consideration of the fact that an ordinary driver is likely to delay in the shift-up in general, and moreover, the fuel consumption performance is affected to a considerable extent when the shift-up is delayed, only the shift-up region or regions may be set in the aforesaid data map or maps to give only the shift-up instruction to the driver, so that the optimum shift timing indication device can be simplified.

It should be apparent to those skilled in the art that the above-described embodiments are merely representative of the applications of the principles of the preent invention. Numerous and varied other arrangements can be readily devised by those skilled in the art without departing from the spirit and the scope of the invention.

What is claimed is:

1. An optimum shift-timing-indicating device for a vehicle comprising:
   an engine speed sensor for detecting a rotational speed of a vehicle engine;
   a load sensor for detecting an engine load;
   data processing means having at least one data map so that a number of data maps is fewer in number than gear positions of a transmission of said vehicle, said at least one map having a set shift-up region and a set shift-down region varying in accordance with the rotational speed of the engine and the engine load, for emitting one of a shift-up instruction signal and a shift-down instruction signal in accordance with the detected rotational speed of the engine and the detected engine load; and
   shift instructing means for giving a driver one of a shift-up instruction and a shift-down instruction in response to the instruction signal output from said data processing means.

2. An optimum shift-timing-indicating device for a vehicle as set forth in claim 1, wherein said engine load is obtained from an intake air flowrate per rotation of the engine.

3. An optimum shift-timing-indicating device for a vehicle as set forth in claim 1, wherein said at least one data map includes a single data map.

4. An optimum shift-timing-indicating device for a vehicle as set forth in claim 1, further including a vehicle speed sensor for detecting a speed of said vehicle and wherein said at least one data map includes two data maps respectively set in accordance with a gear position on a higher speeds' side and a gear position on a lower speeds' side of said transmission.

5. An optimum shift-timing-indicating device according to claim 4 wherein a set shift-down region for a gear position on a higher speeds' side and a set shift-down region for a gear position on a lower speeds' side of said transmission are the same.

6. An optimum shift-timing-indicating device for a vehicle as set forth in claim 1, wherein said data processing means is prevented from emitting said one of a shift-up instruction signal and a shift-down instruction signal when a throttle valve is closed, a clutch is in operation or the vehicle is stopped.

7. An optimum shift-timing-indicating device for a vehicle as set forth in claim 1, further including a vehicle speed sensor for detecting a speed of said vehicle, and wherein said data processing means is prevented from emitting said shift-up instruction signal during vehicle operation at a highest speed gear position.

8. An optimum shift-timing-indicating device for a vehicle as set forth in claim 1, wherein said shift instructing means gives aural instructions and visual instructions.

9. An optimum shift-timing-indicating device according to claim 1, further including vehicle speed sensor means for detecting the speed of the vehicle, and wherein said data processing means includes means for determining a gear position by calculating a ratio between the rotational speed of the engine and the detected vehicle speed.

10. An optimum shift-timing-indicating-device for a vehicle comprising:
    a vehicle speed sensor for detecting a running speed of the vehicle;
    a load sensor for detecting an engine load;
    a data processing means having at least one data map so that a number of data maps is fewer in number than a number of gear positions of a transmission of said vehicle, said data map having a set shift-up region and a set shift-down region varying in accordance with the running speed of the vehicle and the engine load, for emitting one of a shift-up instruction signal and a shift-down instruction signal in accordance with the detected running speed of the vehicle and the detected engine load; and
    shift instructing means for giving a driver one of a shift-up instruction and a shift-down instruction in response to the instruction signals output from said data processing means.

11. An optimum shift-timing-indicating device for a vehicle as set forth in claim 10, wherein said engine load is obtained from an intake air flowrate per rotation of the engine.

12. An optimum shift-timing-indicating device for a vehicle as set forth in claim 10, wherein said at least one data map includes a single data map.

13. An optimum shift-timing-indicating device for a vehicle as set forth in claim 10, wherein said at least one data map includes two data maps respectively set in accordance with a gear position on a higher speeds' side and a gear position on a lower speeds' side of said transmission.

14. An optimum shift-timing-indicating device for a vehicle as set forth in claim 10, wherein said data processing means is prevented from emitting said one of a shift-up instruction signal and a shift-down instruction signal when a throttle valve is closed, a clutch is in operation or the vehicle is stopped.

15. An optimum shift-timing-indicating device for a vehicle as set forth in claim 10, wherein said data processing means is prevented from emitting said shift-up instruction signal during vehicle operation at a highest speed gear position.

16. An optimum shift-timing-indicating device for a vehicle as set forth in claim 10, wherein said shift instructing means gives aural instructions and visual instructions.

17. An optimum shift-timing-indicating device for a vehicle comprising:
a vehicle speed sensor for detecting a running speed of the vehicle;
a load sensor for detecting an engine load;
data processing means having at least one data map so that a number of data maps is fewer in number than a number of gear positions of a transmission of said vehicle, said at least one data map having a set shift-up region varying in accordance with the running speed of the vehicle and the engine load, for emitting a shift-up instruction signal in accordance with the detected running speed of the vehicle and the detected engine load; and
shift instructing means for giving a driver a shift-up instruction in response to the instruction signal output from said data process means.

18. An optimun shift-timing-indicating device for a vehicle comprising:
a vehicle speed sensor for detecting a running speed of the vehicle;
a load sensor for detecting an engine load;
a data process means having at least one data map so that a number of data maps is fewer in number than a number of gear positions of a transmission of said vehicle, said at least one data map having a set shift-down region varying in accordance with the running speed of the vehicle and the engine load, for emitting a shift-down instruction signal in accordance with the detected running speed of the vehicle and the detected engine load; and
shift instructing means for giving a driver a shift-down instruction in response to the instruction signal output from said data processing means.

19. An optimum shift-timing-indicating device for a vehicle comprising:
an engine speed sensor for detecting a rotational speed of an engine;
a load sensor for detecting an engine load;
data processing means having at least one data map so that a number of data maps is fewer in number than gear positions of a transmission of said vehicle, said at least one data map having a set shift-up region varying in accordance with the rotational speed of the engine and the engine load, for emitting a shift-up instruction signal in accordance with the detected rotational speed of the engine and the detected engine load; and
shift instructing means for giving a driver a shift-up instruction in response to the instruction signal output from said data processing means.

20. An optimum shift-timing-indicating device for a vehicle comprising:
an engine speed sensor for detecting a rotational speed of an engine;
a load sensor for detecting an engine load;
a data processing means having at least one data map so that a number of data maps is fewer in number than gear positions of a transmission of said vehicle, said at least one data map having a set shift-down region varying in accordance with the rotational speed of the engine and the engine load, for emitting a shift-down instruction signal in accordance with the detected rotational speed of the engine and the detected engine load; and
shift instructing means for giving a driver a shift-down instruction in response to the instruction signal output from said data processing means.

* * * * *